United States Patent
B'Far et al.

(10) Patent No.: US 9,654,594 B2
(45) Date of Patent: May 16, 2017

(54) SEMI-SUPERVISED IDENTITY AGGREGATION OF PROFILES USING STATISTICAL METHODS

(71) Applicant: ORACLE INTERNATIONAL CORPORATION, Redwood Shores, CA (US)

(72) Inventors: Reza B'Far, Huntington Beach, CA (US); Kent Spaulding, Portland, OR (US); Yasin Cengiz, Irvine, CA (US); Americo Caves, Irvine, CA (US); Fun Goh, Irvine, CA (US); Elizabeth Lingg, Pleasanton, CA (US); Yenal Kal, Irvine, CA (US); Yemin Shi, Irvine, CA (US); Chengxiao Fu, Burlingame, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 166 days.

(21) Appl. No.: 13/932,269

(22) Filed: Jul. 1, 2013

(65) Prior Publication Data
US 2014/0074928 A1    Mar. 13, 2014

Related U.S. Application Data

(60) Provisional application No. 61/699,243, filed on Sep. 10, 2012.

(51) Int. Cl.
| G06F 15/16 | (2006.01) |
|---|---|
| H04L 29/08 | (2006.01) |
| G06Q 50/00 | (2012.01) |

(52) U.S. Cl.
CPC .......... *H04L 67/306* (2013.01); *G06Q 50/01* (2013.01)

(58) Field of Classification Search
CPC ............................. G06Q 50/01; H04L 67/306
USPC ......................................................... 709/204
See application file for complete search history.

(56) References Cited

U.S. PATENT DOCUMENTS

| 7,324,954 | B2 | 1/2008 | Calderaro et al. |
|---|---|---|---|
| 7,467,206 | B2* | 12/2008 | Moore et al. ................. 709/225 |
| 7,676,034 | B1* | 3/2010 | Wu et al. ................. 379/265.01 |
| 7,945,586 | B1 | 5/2011 | Fang et al. |
| 8,205,239 | B1 | 6/2012 | Satish |
| 8,812,342 | B2 | 8/2014 | Barcelo et al. |
| 8,826,426 | B1 | 9/2014 | Dubey |
| 9,015,795 | B2 | 4/2015 | B'Far et al. |
| 9,043,257 | B1* | 5/2015 | Brown ................... G06Q 30/02 706/45 |
| 2002/0133365 | A1* | 9/2002 | Grey et al. ........................ 705/1 |
| 2006/0047725 | A1* | 3/2006 | Bramson ............... G06F 21/604 |

(Continued)

OTHER PUBLICATIONS

U.S. Appl. No. 13/932,304, Apr. 23, 2014, No Office Actions to Date.

(Continued)

*Primary Examiner* — Frantz Jean
(74) *Attorney, Agent, or Firm* — Kilpatrick Townsend & Stockton LLP

(57) ABSTRACT

User profiles can be analyzed to identify profiles matching to the same identity. For example, profiles from different social network systems are analyzed to determine if the profiles are associated with the same user of the social network systems. Multiple heuristics may be calculated using different algorithms. The calculated heuristics may then be combined to generate a match score that indicates whether two profiles match.

20 Claims, 9 Drawing Sheets

(56) References Cited

U.S. PATENT DOCUMENTS

| | | | |
|---|---|---|---|
| 2007/0208869 A1 | 9/2007 | Adelman et al. | |
| 2007/0294281 A1 | 12/2007 | Ward et al. | |
| 2008/0005778 A1 | 1/2008 | Chen et al. | |
| 2008/0109244 A1* | 5/2008 | Gupta | 705/1 |
| 2008/0109491 A1 | 5/2008 | Gupta | |
| 2008/0214148 A1* | 9/2008 | Ramer et al. | 455/414.1 |
| 2008/0214155 A1* | 9/2008 | Ramer et al. | 455/414.1 |
| 2009/0063298 A1* | 3/2009 | Hodges et al. | 705/26 |
| 2009/0234711 A1* | 9/2009 | Ramer et al. | 705/10 |
| 2009/0254529 A1* | 10/2009 | Goldentouch | 707/3 |
| 2010/0070448 A1 | 3/2010 | Omoigui | |
| 2010/0106557 A1 | 4/2010 | Buss | |
| 2010/0125911 A1 | 5/2010 | Bhaskaran | |
| 2010/0174754 A1 | 7/2010 | B'Far et al. | |
| 2011/0219424 A1 | 9/2011 | Panasyuk et al. | |
| 2011/0313853 A1* | 12/2011 | Ramer et al. | 705/14.46 |
| 2011/0320536 A1* | 12/2011 | Lobb et al. | 709/205 |
| 2012/0072268 A1 | 3/2012 | Ritter | |
| 2012/0124033 A1* | 5/2012 | Gabriel et al. | 707/722 |
| 2012/0173358 A1* | 7/2012 | Soroca et al. | 705/26.3 |
| 2012/0290977 A1* | 11/2012 | Devecka | 715/810 |
| 2012/0303659 A1* | 11/2012 | Erhart et al. | 707/769 |
| 2012/0323694 A1* | 12/2012 | Lita et al. | 705/14.66 |
| 2013/0179215 A1 | 7/2013 | Foster et al. | |
| 2013/0297373 A1 | 11/2013 | Proux | |
| 2014/0052555 A1* | 2/2014 | MacIntosh | 705/23 |
| 2014/0074547 A1 | 3/2014 | B'Far et al. | |
| 2014/0074560 A1 | 3/2014 | B'Far et al. | |
| 2014/0075500 A1 | 3/2014 | B'Far et al. | |
| 2015/0293997 A1* | 10/2015 | Smith | H04L 51/32 707/749 |

OTHER PUBLICATIONS

U.S. Appl. No. 13/932,269, Apr. 23, 2014, No Office Actions to Date.

U.S. Appl. No. 13/932,265, Notice of Allowance mailed on Dec. 11, 2014, 20 pages.

Chen et al., Risk-Aware Role-Based Access Control, 7th International Workshop on Security and Trust Management, Jun. 27-28, 2011, 16 pages.

Krautsevich et al., Usage Control, Risk and Trust, 7th International Conference, TrustBus, Aug. 30-31, 2010, pp. 1-12.

U.S. Appl. No. 13/932,286, Non-Final Office Action mailed on Oct. 1, 2014, 13 pages.

U.S. Appl. No. 13/932,286, Final Office Action mailed on May 7, 2015, 18 pages.

U.S. Appl. No. 13/932,304, Non-Final Office Action mailed on Apr. 23, 2015, 32 pages.

U.S. Appl. No. 13/932,265, Dec. 11, 2014, Notice of Allowance.

U.S. Appl. No. 13/932,286, Oct. 1, 2014, Non-Final Office Action.

U.S. Appl. No. 13/932,286, May 7, 2015, Final Office Action.

U.S. Appl. No. 13/932,286, Sep. 17, 2015, Non-Final Office Action.

U.S. Appl. No. 13/932,304, Apr. 23, 2015, Non-Final Office Action.

U.S. Appl. No. 13/932,304, Oct. 8, 2015, Final Office Action.

U.S. Appl. No. 13/932,269, Apr. 23, 2015, No Office Actions to Date.

U.S. Appl. No. 13/932,286, Non-Final Office Action mailed on Sep. 17, 2015, 22 pages.

U.S. Appl. No. 13/932,304, Final Office Action mailed on Oct. 8, 2015, 35 pages.

U.S. Appl. No. 13/932,304, filed Jul. 1, 2013, Advisory Action mailed on Dec. 24, 2015, all pages.

U.S. Appl. No. 13/932,286, filed Jul. 1, 2013, Final Office Action mailed on Mar. 31, 2016, all pages.

U.S. Appl. No. 13/932,269, Non-Final Office Action mailed on Jul. 5, 2016, 10 pages.

U.S. Appl. No. 13/932,286, Non-Final Office Action mailed on Sep. 15, 2016, 26 pages.

U.S. Appl. No. 13/932,304, Non-Final Office Action mailed on Jun. 17, 2016, 42 pages.

* cited by examiner

SEMI-SUPERVISED IDENTITY AGGREGATION OF PROFILES USING STATISTICAL METHODS

CROSS-REFERENCES TO RELATED APPLICATIONS

The present application claims benefit under 35 USC 119(e) of U.S. Provisional Application No. 61/699,243, filed on Sep. 10, 2012 by B'Far et al. and entitled "Semi-Supervised Identity Aggregation of Profiles Using Statistical Methods," of which the entire disclosure is incorporated herein by reference for all purposes.

The present application is also related to the following co-pending and commonly assigned U.S. Patent Applications:

U.S. patent application Ser. No. 13/932,304 filed concurrent herewith by B'Far et al. and entitled "Advanced Skill Match and Reputation Management for Workforces," and which claims priority to U.S. Provisional Application No. 61/699,233, filed on Sep. 10, 2012 by B'Far et al. and entitled "Advanced Skill Match and Reputation Management for Workforces;"

U.S. patent application Ser. No. 13/932,286 filed concurrent herewith by B'Far et al. and entitled "Personal and Workforce Reputation Provenance in Applications," and which claims priority to U.S. Provisional Application No. 61/699,250, filed on Sep. 10, 2012 by B'Far et al. and entitled "Personal and Workforce Reputation Provenance in Applications;" and U.S. patent application Ser. No. 13/932,265 filed concurrent herewith by B'Far et al. and entitled "Reputation-Based Auditing of Enterprise Application Authorization Models," and which claims priority to U.S. Provisional Application No. 61/699,238, filed on Sep. 10, 2012 by B'Far et al. and entitled "Reputation-Based Auditing of Enterprise Application Authorization Models," of which the entire disclosure of each is incorporated herein by reference for all purposes.

BACKGROUND OF THE INVENTION

Social media is exerting an increasingly significant and sometimes unanticipated effect on individuals, business, even nations. It is increasingly important for organizations to be actively aware of any consequences that might arise from social media usage by its employees. Social media awareness can also be a useful tool in expeditiously sifting through a large number of recruitment candidates, reducing the total number of man-hours that is required to complete recruitment tasks.

Today a preponderance of people in the developed world have used social media in one form or another, creating social media profiles that allow them to share information with others. Many people have multiple accounts across different social media networks. The information a person shares can be very different from network to network, due to the different character and culture of each network.

For example, an individual may have a profile on Facebook™ and an employee profile in an organization's internal system. His Facebook™ profile indicates that he is interested in surfing and fencing, while his employee profile only contains information relevant to his employment and therefore does not mention his interest in surfing or fencing. A single profile contains a proper subset of all the data that could be in a profile for a person. Thus, the data one may have on a person from one profile may be incomplete. Any automated algorithms that process data by traversing the social media graph would benefit from being able to correctly recognize multiple profiles belonging to the same person, instead of incorrectly identifying them as separate individuals. For example, an attempt to count the number of social media fans for a particular brand would be much more accurate if the same person were not counted multiple times for each profile on LinkedIn™, Twitter™, and Facebook™.

The fragmentation of personal data across different social media networks presents a number of difficulties when attempting to determine if two different profiles belong to the same person. People can fill out different subsets of their personal information for each network, based on their perceived importance and relevance for each network. For example, the employment history might be fully described in a person's LinkedIn profile, but left blank in the Facebook profile, while his interest in surfing is mentioned in Facebook but not LinkedIn. People can also intentionally or unintentionally enter data inconsistencies across different networks. An individual might enter an inconsistent birthday to appear younger on Facebook, while desiring to appear older on LinkedIn. Older social media profiles that are no longer being actively updated may present different addresses or phone numbers than currently maintained profiles. A person might use a casual nickname on Facebook while desiring to appear more formal on LinkedIn. Beyond trusting the intentions of the social media user, conventional techniques for processing social media information typically lack a practical way to verify data's validity.

BRIEF SUMMARY OF THE INVENTION

Embodiments of the invention provide systems and methods for semi-supervised identity aggregation of profiles in which user profiles can be analyzed to identify profiles matching to the same identity. For example, profiles from different social network systems are analyzed to determine if the profiles are associated with the same user of the social network systems. Multiple heuristics may be calculated using different algorithms. The calculated heuristics may then be combined to generate a match score that indicates whether two profiles match.

Techniques described and suggested herein related to a semi-supervised approach towards reconciliation of these issues. Congruence between two potentially matching profiles, in various embodiments, are established via multiple identification methods, with each method assigning a heuristic score that can be aggregated for a total matching score. An appropriate heuristic weight for the significance of each method score is may be found by analyzing a sample corpus of known matching profiles, that can be acquired through multiple means. Such data can be acquired through automated processes from profiles containing semantically tagged meta-data that unambiguously declare a match. Alternately, it can also be acquired from user-identified matches entered through a provided user interface. The time it takes for the manual process of user-identified matching can be substantially alleviated by software processes that delineate a useful subset of likely matches. This subset can be acquired from the set of profiles that have a high matching score from the automated multi-attribute matching algorithm, scores that were not high enough for the automated process to identify with certainty a matching profile, but high enough to indicate a likely match.

In an embodiment, a more formal definition of the terms and parameters that have to be considered as well as a formal definition for the problem space are established. Criteria in selecting matching methods are configured to be both pluggable and additive. Pluggable may refer to the benchmark that the method is sufficient but is not necessary in correctly identifying a matching profile. This allows inclusion or exclusion of the matching method at user discretion should it not be available for a particular social network for whatever reason. Additive may refer to the selected attribute being strictly ordered, reflexive, symmetric effect on the final matching score, although it is not necessarily monotonic. This gives greater flexibility should users decide to modify the choice of heuristic methods used in determining a match.

Stated another way, aggregating social network profiles can comprise accessing data of a first profile from a first data source, accessing data of a second profile from a second data source, and determining whether the second profile is identified by the first profile. In response to determining that the second profile is identified by the first profile, the second profile can be identified as matching the first profile. In response to determining that the second profile is not identified by the first profile, one or more heuristics can be calculated and a determination can be made as to whether the first profile and the second profile match based on the calculated one or more heuristics.

For example, calculating one or more heuristics comprises obtaining attributes of the first profile, generating attributes of the second profile, identifying attributes of the second profile matching attributes of the first profile, and calculating a heuristic based at least in part on the identified matching attributes. In another case, calculating one or more heuristics can comprise obtaining one or more expressions of interest from the first profile, obtaining one or more expressions of interest from the second profile, identifying expressions of interest from the second profile matching expressions of interest from the first profile, and calculating a heuristic based at least in part on the identified matching expressions of interest. Additionally or alternatively, calculating one or more heuristics can comprise obtaining one or more profile connections from the first profile, obtaining one or more profile connections from the second profile, identifying profile connections from the second profile matching profile connections from the first profile, and calculating a heuristic based at least in part on the identified matching profile connections. In yet another example, calculating one or more heuristics can additionally or alternatively comprise obtaining one or more images associated with the first profile, obtaining one or more images associated with the second profile, identifying faces within the obtained images associated with the first profile and the images associated with the second profile, identifying images associated with the second profile matching images associated with the first profile based on the identified faces, and calculating a heuristic based at least in part on the identified matching images. In some implementations, calculating one or more heuristics can comprise obtaining content posted in connection with the first profile, obtaining content posted in connection with the second profile, identifying content posted in connection with the first profile that at least partially matches content posted in connection with the second profile, calculating a number of instances of at least partially matching content that is posted to both the first profile and the second profile within a time threshold, and calculating a heuristic based at least in part on the calculated number of instances. Additionally or alternatively, calculating one or more heuristics can comprise obtaining a set of hyperlinks posted in connection with the first profile, obtaining a set of hyperlinks posted in connection with the second profile, identifying hyperlinks posted in connection with the first profile that at least partially matches hyperlinks posted in connection with the second profile, calculating a number of matching hyperlinks that are posted to both the first profile and the second profile, and calculating a heuristic based at least in part on the calculated number of matching hyperlinks. Other alternatives are contemplated and considered to be within the scope of the present invention.

DETAILED DESCRIPTION OF THE INVENTION

Figure 1:
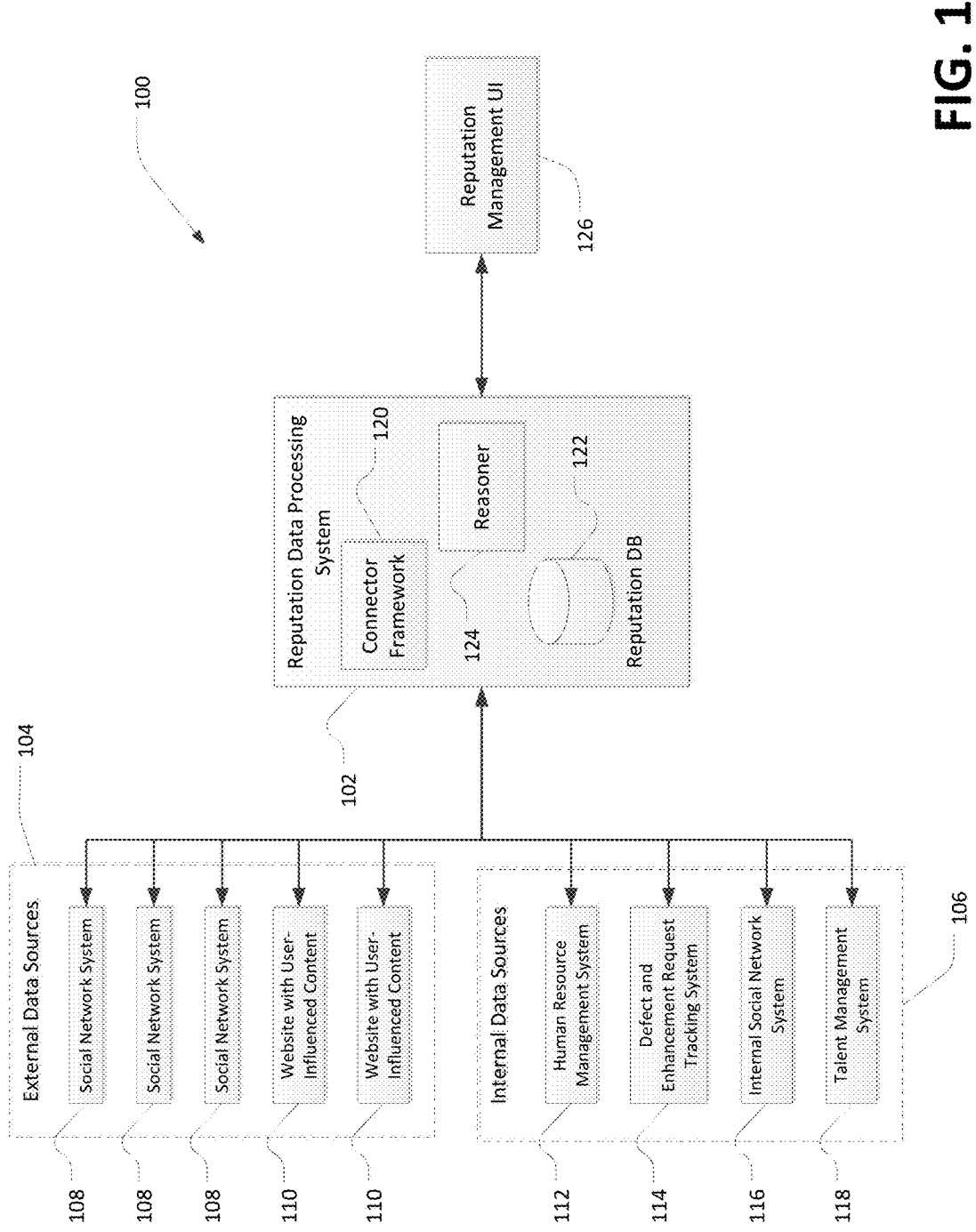
FIG. 1 shows an illustrative example of an environment in which various embodiments of the present disclosure may be practiced.

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Given a set $P=\{p_1, p_2, \ldots, p_n\}$ of profiles extracted from an arbitrary set of data sources, we define a function $\phi_B$: $P \times P \rightarrow B$ where $B=\{0, 1\}$ is a Boolean domain. Given a pair of profiles $p_1$ and $p_2$, $\phi_B(p_1, p_2)$ may be a function that indicates if two profiles belong to the same person ($\phi_B(p_1, p_2)=1$). Note that $\phi_B$ may be an equivalence relation that is, therefore, reflexive, symmetric, and transitive.

Defining $\phi_B$ is a non-trivial problem and, in an embodiment, is defined using heuristic approaches. Regardless of how $\phi_B$ is evaluated for a pair of profiles, the possibility of both false positives and false negatives occurring is taken into account. This, in many instances, is the unavoidable consequence of the aforementioned issues with fragmentation of data, insufficiently overlapping data sets, and the high likelihood of encountering inconsistent data sets. This is why our semi-supervised approach results in large wins in surmounting these difficulties. Any false positives or false negatives generated by an inadequately descriptive $\phi_B$ can be corrected by user input and this result can be used in recalibrating the heuristic weights used in allocating the match score, resulting in a more accurate $\phi_B$.

To address the issues with defining $\phi_B$, in an embodiment, we relax the problem and let the range of $\phi_B$ take on a value in the interval [0,1]. This allows us to define the degree to which the function believes that two profiles belong to the same person. In addition to this metric on equality, which we will define as relevance, in an embodiment, we include three additional metrics on the certainty of the result of $\phi_B$. So we redefine $\phi_B$ to $\phi:P\times P\to[0,1]$. The four metrics in the range of $\phi$ are:

Relevance—A (heuristic) measure, for example from [0,1], of how "equal" two profiles are to one another.

Accuracy—A measure of the accuracy of the relevance score, for example in the range from [0,1]. This is a measure of how likely the relevance score is the actual relevance score.

Precision—A measure, for example in the a range of [0,1], of how likely a repeat computation of relevance is to be the same as the currently calculated score. In other embodiments, precision may be a confidence measure of the relevance score. This can be thought of as a measure of the number of significant digits about which the algorithm is confident.

Importance—A measure of how well-connected a given profile is in relation to other profiles. Importance may also be a measure configured to increase as the collective connectivity of two profiles increases (e.g. as the sum of the number of direct connections in the respective social network(s) increases). Connections may be, for example, Facebook Friends, LinkedIn connections, Twitter followers, a ratio of people being followed to the number of followers in Twitter, and/or the like.

Importance, in many embodiments, can be a useful metric that used to prioritize which profiles should be manually examined in order to determine if the matching algorithm heuristic weights need to be tuned to improve the accuracy and precision of the algorithm.

There are many ways to evaluate (I). In an embodiment, let $M=\{\phi_1, \ldots, \phi_m\}$ be the set of the magma, in the algebraic sense, containing algorithms that evaluate $\phi$ on a pair of profiles and satisfies the following property: For every $\phi_i$, $\phi_j$, $\phi_k \in M$ such that $\phi_i * \phi_j = \phi_k$ and every pair of profiles $p_a$, $p_b \in P$, let $\alpha(\phi_i(p_a, p_b))$ be the accuracy of $\phi_i$ on $p_a$ and $p_b$ and $\rho(\phi_i(p_a, p_b))$ be the precision of $\phi_i$ $p_a$ and $p_b$. Then we have the following properties:

$$\alpha(\phi_i(p_a,p_b))\leq\alpha(\phi_k(p_a,p_b))$$

$$\alpha(\phi_j(p_a,p_b))\leq\alpha(\phi_k(p_a,p_b))$$

$$\rho(\phi_i(p_a,p_b))\leq\rho(\phi_k(p_a,p_b))$$

$$\rho(\phi_j(p_a,p_b))\leq\rho(\phi_k(p_a,p_b))$$

By constructing M in this manner, we know that the composition of any two algorithms in M will produce an algorithm that has an accuracy and precision that is at least as high as either of the individual algorithms.

Below, some of the possible linking methods for the $\phi_i \in M$ are described. Many social networks provide a means for users to unambiguously identify their accounts in alternate social media. For example there is a specific URL field in a Facebook profile for a user's matching Twitter profile. This provides us with a baseline default matching of correctly identified matches. Unfortunately the current reality is that many people do not enter this information, requiring us to use additional methods.

Most social networks provide a means to enter both structured and unstructured data that can be used to populate a profile. In many cases the unstructured data can also be processed algorithmically into structured data using natural language processing and text analytics methods. This allows us to assign a number of known attributes to each examined social media profile. Some examples of an identifiable attribute could be the user's e-mail address, or a list of his favorite movies, or an identification of family members who are using the same social media network. Different combinations of attributes can provide varyingly accurate likelihoods of matches. For example two different profiles with the same name and the same state might not belong to the same person, but two different profiles with the same name and the same address are much more likely to be the same person. It is important to consider multiple matching attributes, as there can always be unexpected coincidences. For example one might expect two different profiles with the same name and same birthday to be a match, but this is not always true. The heuristic weight for each set of matching attributes can initially be seeded using a predetermined probability matrix, but we can make further use of our existing data set by algorithmically reallocating the weighting of each score based on the accuracy of matches made in newly examined profiles. Even attributes that obviously should match could turn out to be less accurate than expected in actual data. For example it is an easy assumption to think that two different profiles with the same phone number are a match, but it is possible that the cell phone was given to a family member and the older profile was not updated to reflect a transfer in ownership of the cellphone number. Nevertheless it should be possible to identify unique combinations of matching attributes, for example two profiles with the same name, address, and school are very likely to belong to the same person.

If insufficient attribute information is available to conclusively identify a matching profile, in an embodiment, we consider shared behaviors and interests. Based on the declared "likes" of a profile or other expressions of interest, say for example the books, movies, or music that a particular profile likes, we can potentially identify a match. The more "likes" that are in a profile, the more useful this heuristic becomes. Not everyone who likes Justin Bieber is the same person. However if there are two different profiles where both profiles have exactly the same bands that are liked, and there are over a hundred bands, then it is much more likely that there is a match. Some prolific profile users have thousands of likes, so this can be an useful heuristic, especially coupled with the other methods that have been outlined.

We can also use common social connections to identify a match. If two profiles have exactly the same friends, it is possible that the two profiles belong to the same person. This method is a bit more exploratory than the other methods currently listed as people within the same social circle are likely to have the same friends, so it may not correctly identify a match by itself, but it can be used as an useful correlation.

Computer vision and face recognition technology has come a long way in recent years. A frequent usage pattern of social media is users posting multiple profile pictures of themselves. It is quite common for users to post the same pictures of themselves across different social networks, especially since there are automated tools that facilitate this usage pattern. This allows a useful heuristic from identifying different profiles with the same pictures. Face recognition technology allows this to work even when it is not exactly the same picture that is being taken, just the same subjects being taken in the pictures. With some users having shared thousands of photographs of themselves, there is a large data set that we can make use of. We can foresee that the accuracy of the automated algorithms will improve as more data is processed, allowing us to retune our heuristics based on our findings. Furthermore there are additional heuristics that have yet to be identified and might provide useful signals that can be used in improving the work.

Below are described various systems and methods that may be used to implement various embodiments of the present disclosure. The systems may be used, for example, to enable users to match social media profiles to one another in accordance with the various techniques described herein.

FIG. 1 shows an illustrative example of an environment 100 in which various embodiments of the present disclosure may be practiced. In this example, the environment 100 includes a reputation data processing system 102. The reputation data processing system 102 may be one or more computer systems collectively configured to operate in accordance with various embodiments of the present disclosure, such as those embodiments discussed below. An example of such computer system is described below in connection with FIG. 11. In the illustrative example of FIG. 1, the reputation data processing system is configured to obtain data from external data sources 104 and internal data sources 106.

The reputation data processing system 102 may be operated by an organization or on behalf of the organization. As such, external data sources 104 may be computer systems serving as a source of data where the computer systems are operated by and/or on behalf of entities different from the organization. Similarly, internal data sources 106 may be computer systems serving as sources of data where the computer systems are operated by and/or on behalf of the organization. It should be noted that the various data sources, internal and external, may be hosted in various ways. For example, one or more of the internal data sources may be hosted by the organization itself, such as in a data center or other facility of the organization. One or more of the internal data sources may be hosted by third parties. For example, one or more of the internal data sources may operate using facilities and hardware of a third party, yet may be programmatically managed by or on behalf of the organization. The hosting of external data sources may also vary in these ways.

Turning to the external data sources, example data sources include social network systems 108. A social networking system may be a publicly accessible computer system having users from the general public. The term "computer system," unless otherwise contradicted explicitly or by context, is intended to encompass both single computer instances (e.g. a single server) and multiple computer system instances, such as a network of computer system instances that collectively operate to achieve a result. Further, a computer system may also encompass multiple computer system instances that span multiple geographic regions and/or data center facilities. Returning to an example social networking system 108, the users of the social networking system may have accounts and corresponding profiles with the social network systems 108 and may engage in social networking activities. Example social networking activities include communicating electronically with other users of a social network system, either privately or publicly, expressing interest in content, and/or associating profiles with other profiles of the social network system which may be pursuant to mutual acceptance of the association by corresponding users. Specific examples of social networking systems include Facebook®, Twitter®, MySpace®, and others. Some specific examples of social networking activities in the Facebook social network system include friending other users, posting content on another's wall, liking content and/or other users, public or private messaging, un-friending other users, sharing content, and other activities. Example activities in the Twitter social network system include following other users, being followed by other users, tweeting, re-tweeting, and the like.

Generally, any suitable external data source may be used in accordance with various embodiments of the present disclosure. For example, as illustrated in FIG. 1, various websites 110 with user-influenced content may also serve as external data sources for the reputation data processing system 102. A website with user-influenced content may be any public information resource in which content is associated with users of the website. An example website may be an online forum in which users of the forum submit messages for other users to see. Another example of a suitable website is an electronic marketplace in which users of the electronic marketplace are able to electronically provide feedback for other users of the electronic marketplace. For example, one user may purchase a product or otherwise have knowledge of the product and may provide an electronic review of the product for other users to see in connection with their purchasing decisions.

As with external data sources 104, internal data sources 106 may comprise one or more computer systems serving as an internal source of data for the reputation data processing system 102. Typically, organizations utilize various computer systems in connection with management of their operations. An organization, for example, may utilize various computer systems for accounting, human resources, talent management, customer relationship management, internal social networking, internal information sources (e.g. internal websites), and the like. FIG. 1 shows some illustrative examples of suitable internal data sources 106 in accordance with an embodiment. For example, as shown in FIG. 1, the internal data sources 106 include a human resource management system 112 which may be a computer system configured to perform various operations in connection with management of an organization's human resource needs.

The human resource management 112 may, for example, maintain data about employees of the organization and may allow administrators to update, add, and/or remove data for employees of the organization as the set of employees of the organization changes over time. Another example of a suitable internal data source 106 is a defect and enhancement request tracking system 114. A defect and enhancement request tracking system 114 may be a computer system which tracks various issues with products and/or services of the organization. For example, if the organization is a software company, the defect and enhancement request tracking system may enable employees to submit information identifying issues with the software otherwise known as bugs. The defect and enhancement request tracking system may also enable employees to submit information regarding bugs of internal computer systems used by the organization and not necessarily sold to others. For example, an employee may notice a broken link on an internal web page of the organization and, as a result, may submit a ticket which may then be processed by another employee of the organization who may update the internal website accordingly.

As illustrated in FIG. 1, the internal data sources also include an internal social network system 116. The internal social network system 116 may not be publicly accessible. That is, the universe of users of the internal social network system 116 may be limited, such as to employees of the organization, certain employees of the organization and/or individuals and/or computer systems to which the organization has provided authorization. As an example, the internal social network system 116 may be accessible to employees of the organization and certain vendors of the organization such as attorneys working in law firms for the organization. It should be noted and understood that, while referred to here as an "internal" social network system, this system may or may not be hosted internally. That is, it may actually be a hosted outside the company, but have a limited universe of employees, i.e., accessible by internal people.

Also as illustrated in FIG. 1, the internal data sources 106 include a talent management system 118. A talent management system may be a computer system configured to enable employees of the organization to perform various operations in connection with ensuring that the organization has appropriate personnel. For example, an employee of the organization may utilize the talent management system to track individuals who are engaged in the hiring process of the organization and/or to locate candidates for open positions. The talent management system may maintain resumes, may perform automated processing of received resumes, and the like. Example talent management systems include those offered under the brand name Taleo. It should be noted and understood that this system might be hosted elsewhere, but would considered "internal" in the sense that only "internal" people have access to this system.

As noted above, numerous variations of the environment 100 are considered as being within the scope of the present disclosure. For example, while FIG. 1 shows various illustrative examples of external data sources 104 and internal data sources 106, numerous embodiments of the present disclosure may have more or fewer data sources than those explicitly illustrated.

Turning to the reputation data processing system 102, in an embodiment, the system includes multiple components. For example, as illustrated in FIG. 1, the reputation data processing system 102 includes a connecter framework 120. The connector framework 120 of the reputation data processing system 102 may be a component (e.g. separate computer system instance(s) or programming module) configured to enable the reputation data processing system 102 to obtain data from the external data sources 104 and internal data sources 106. The connector framework 120 may, for example, operate according to programming logic that enables the connector framework 120 to obtain data from numerous different data sources and combine the data in a manner suitable for processing by the reputation data processing system such as described below.

For example, many of the external data sources 104 and/or internal data sources 106 may provide data that is organized in different ways. The connector framework 120 may include programming logic to extract data and store data from multiple sources in a common manner such as in accordance with a common data storage schema. The connector framework may obtain data from the various data sources in numerous ways. For example, in an embodiment, the connector framework is configured to obtain data from the various data sources according to application programming interfaces (APIs) of the various systems. For example, a social network system 108 may include an API for obtaining data available in the API. The connector framework may include programming logic for making API calls in a manner acceptable to the social network system. Different social network systems may have different APIs and the connecter framework may be configured appropriately to obtain data from the different sources.

The connector framework 120 may also be configured to obtain data in other ways. For example, data posted on web pages may be obtained by downloading web pages or other documents of the data source. For instance, a website may correspond to a domain name. The connector framework 120 may enable the reputation data processing system to obtain a web page or other document by using the URL. The connector framework may analyze and receive documents and store data accordingly. The connector framework 120 may also utilize various screen scraping techniques and generally any technique in which data from a data source may be obtained.

As noted above, the connector framework 120 in an embodiment enables the reputation data processing system to obtain data from various different sources and store the data according to a common schema or generally in a manner suitable for use by the reputation data processing system. In an embodiment as illustrated in FIG. 1, the data received through the connector framework 120 is stored by the reputation data processing system into a reputation database 122. The reputation database may be any data storage mechanism that enables the reputation data processing system to operate in accordance with the various embodiments described herein.

The reputation database may, for example, be a relational database comprising a computer system that utilizes storage to store data in multiple tables, where the tables associate some of the data with other data. For example a table may associate an identifier of an employee with data collected about the employee, such as data regarding the employee's activity in a social network and/or other electronic environment. According to some embodiments, much of the collected data can be stored in a triple-store (aka a graph database) and the remainder in a relational database. In such a mixed model, data can be stored based on how it will be analyzed later, i.e., it can be stored where future analysis will be most efficient. Once data is obtained from multiple sources and stored in the reputation database 122, a reasoner 124 of the reputation data processing system may process data accessed from the reputation database 122. The reasoner accordingly may be a component of the reputation data processing system that is configured to analyze data from the reputation database in accordance with the various embodiments described herein.

The reasoner 124 may, for example, analyze data from the reputation database 122 in order to determine an individual influence based on the data that was obtained about the individual. Similarly, the reasoner 124 may be used to decide which data is stored persistently in the reputation database 122. For example, the connector framework 120 in an embodiment may obtain more data than is necessary and/or desirable for use in accordance with the various embodiments. The reasoner 124 may accordingly analyze data to determine whether to discard the data or store the data in the reputation database 122.

In an embodiment, the environment 100 includes a reputation management user interface 126, which enables users of the reputation data processing system 102 to engage in various activities, such as by defining data analysis for the data processing system 102 to perform, specifying data sources and which data is to be obtained from the specified data sources, specifying parameters for maintaining data (e.g. how much data to store for each user, how to determine which data to keep and which to discard, and the like), viewing presentations of data and results of analysis of the data by the reputation data processing system 102, generating white label applications for data sources, and other activities. In an embodiment, the reputation management user interface 126 is an application operating on a computer system instance separate from the reputation data processing system 102, obtaining data for presentations and/or the presentations themselves from the reputation data processing system 102. The reputation management user interface 126 may be an application constructed using application development framework (ADF) tools, such as those available from Oracle Corporation. However, the reputation management user interface 126 may be any suitable application and, in some embodiments, the reputation management user interface is presented in a web browser, presenting presentations obtained from a web server of the reputation data processing system 102 (e.g. in the form of HTML pages). Also, while illustrated separately from the reputation data processing system 102, the reputation management user interface 126 may be a component of the reputation data processing system 102. For example, if the reputation data processing system is operated as a server or cluster of servers, the reputation management user interface 126 may be a module of the reputation data processing system 102 implemented by the server and/or one or more of the servers of the cluster.

The reputation management user interface 126 may also be separate from the reputation data processing system 102. For instance, the reputation management user interface 126 may be implemented by a server different from a server or cluster of servers that implements the reputation data processing system 102. Similarly, the reputation management user interface may be implemented as multiple components implemented themselves on different hardware devices. For example, the reputation management user interface 126 may be implemented collectively by a server and a client application executing on a hardware device of a user of the reputation management user interface 126. In an embodiment, the reputation management user interface enables users to view presentations of data and results of analysis of the data.

In an embodiment, the presentations presented by the reputation management user interface 126 include graphics and/or text which provide intuitive views of data in the reputation database and/or results of analysis of that data. In an embodiment, a user of the reputation management user interface provides user input that is transmitted to the reputation data processing system 102. The reasoner 124 may then process data from the reputation database 122 in accordance with the user input. Results of processing by the reasoner 124 may be provided to the reputation management user interface 126 for presentation to the user. Similarly, input by the user may be transmitted to the reputation data processing system 102 which may submit a query to the reputation database 122 to obtain data stored by the reputation database 122 which is then provided either directly or in a processed form to the reputation management user interface 126 for presentation to the user.

User input into the reputation management user interface 126 may also cause results from the reasoner 124 and data from the reputation database 122 to be provided for presentation to the user. Plus, in general, in an embodiment, the representation management user interface enables users to direct operation of the reputation data processing system 102 in accordance with its programmed capabilities. Additional capabilities may include, for example, obtaining data from a data source in response to user input provided to the reputation management user interface 126.

In various embodiments, the reputation management user interface 126 includes one or more additional features. For example, in an embodiment, the reputation management user interface 126 includes reusable ADF and/or API components that allow others to build additional applications that make use of data and analysis through the reputation data processing system 102. Reputation metrics and other values calculated by the reputation data processing system 102 may be used, for instance, to serve other purposes in addition to those described explicitly herein. For instance, reusable ADF components of the user interface 126 may be used to build a custom application for a marketing department to enable users in the marketing department to hone their skills and view how their activities serve their reputations and the reputations of the organization as well as how their activities may cause undue risk to the organization.

As another example, in some embodiments, the reputation management user interface 126 includes functionality to generate white label applications for one or more social networking systems and/or other system. A white label application built for a social network system may, for example, be installed by a user as a condition for receiving one or more rewards or other recognition. An example of such rewards may be a restaurant or retailer discounts. In such cases, if an employee shares more information, they may, in some embodiments, receive larger discounts, discounts at a larger set of retailers, or unlock extra coupon codes. Once installed, the white label application may give the organization access to information maintained by the social network system in a non-public manner. For example, using Facebook as an example, use of the white label application may give the organization access to information that is not accessible to the general public, but to a more limited group of Facebook users, such as those identified as friends of the user that installed the white label application. In an embodiment, the white label application allows the user to specify various privacy settings that determine how much and which types of information are shared with the organization. In some embodiments, the white label application is a wrapper for a benefit management application such that benefits to the employee may vary according to the amount of information shared by the employee. In this manner, the employee can choose the level of benefits and information sharing that he or she is most comfortable with.

Figure 2:
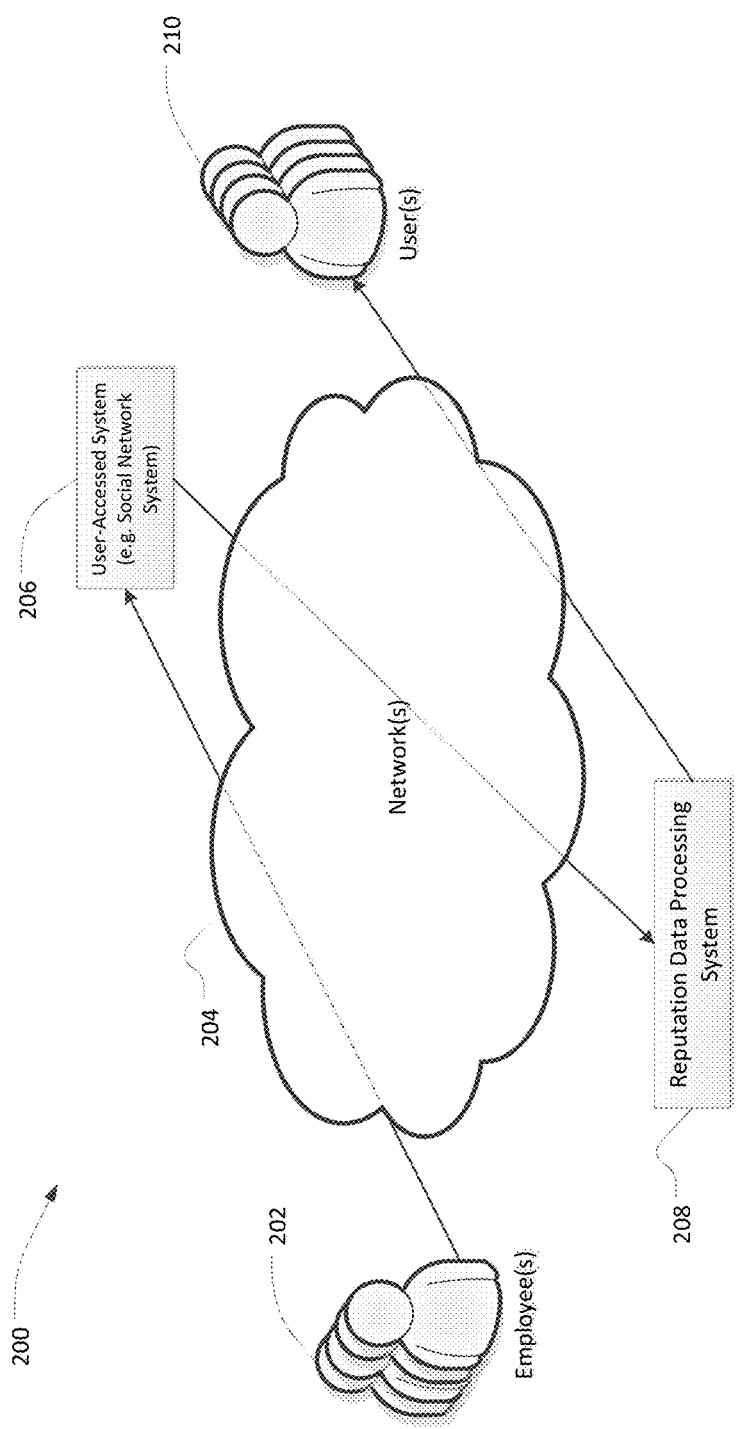
FIG. 2 shows an alternative illustrative example of the environment of FIG. 1 in which various embodiments of the present disclosure may be practiced.

FIG. 2 shows an illustrative example of an environment 200 in which various embodiments of the present disclosure may be performed. Environment 200 may be the environment 100 described above in connection with FIG. 1 or another environment. In the environment 200, employees 202 of an organization utilize one or more networks 204 to access a user-accessed system 206. The network 204 may be the Internet and an intranet, a mobile communications network and generally any suitable communications network or combination of networks. User-accessed system 206 may be an internal or external data source such as described above. For example, in an embodiment the user-accessed system may be a social network system.

The employees 202 of the organization may access the user-accessed system using various devices. Example devices include: personal computer systems, mobile devices such as smart phones, tablet computing devices and generally any device configured to communicate with the user-accessed system 206. As shown in FIG. 2, a reputation data processing system 208, such as the reputation data processing system described above in connection with FIG. 1, obtains data from the user-accessed system 206. For example, the reputation data processing system 208 may submit an API call to the user-accessed system 206 which may provide a response accordingly with data specified by the API call.

For example, the reputation data processing system 208 in an embodiment may submit an API call to obtain data about an employee 202 specified in the API call. The API call may, for example, specify a user name utilized by the employee when accessing the user-accessed system 206. Accordingly, the reputation data processing system 208 in an embodiment may maintain data that associates internal identifiers of employees with corresponding user names of the user-accessed system 206. It should be noted, however, that the reputation data processing system and the user-accessed system may utilize the same identifier for a single employee. For example, the user-accessed system may be an internal system of the organization and a single identifier may be used by the reputation data processing system 208 and the user-accessed system 206.

As noted above, the reputation data processing system 208 may obtain data from the user-accessed system 206 in other ways such as by requesting a web page of the user-accessed system 206 and processing data from the web page accordingly. In another example, the reputation data processing system may request data in batches. For example, the organization may maintain an account with the user-accessed system 206. The reputation data processing system 208 may then, for example, submit an API call requesting current data for the account such as data for all employees of the organization having an account with the user-accessed system 206. Generally, the reputation data processing system 208 may obtain data from the user-accessed system 206 in any suitable manner including in manners not explicitly described herein. In addition, the data processing system may determine which received data to store in a persistent manner.

Data that has been stored and/or processed by the reputation data processing system 208 may be accessed by users 210 of the organization and/or users acting on behalf of the organization. Such users may be users interested in compliance of the organization, reputation of the organization and hiring for the organization and/or generally any users who utilize the reputation data processing system as part of their activities. Users may access the reputation data processing system through a browser or other application configured to submit requests for presentations of data to the reputation data processing system 208 which may then provide appropriate responses to the users.

Figure 3:
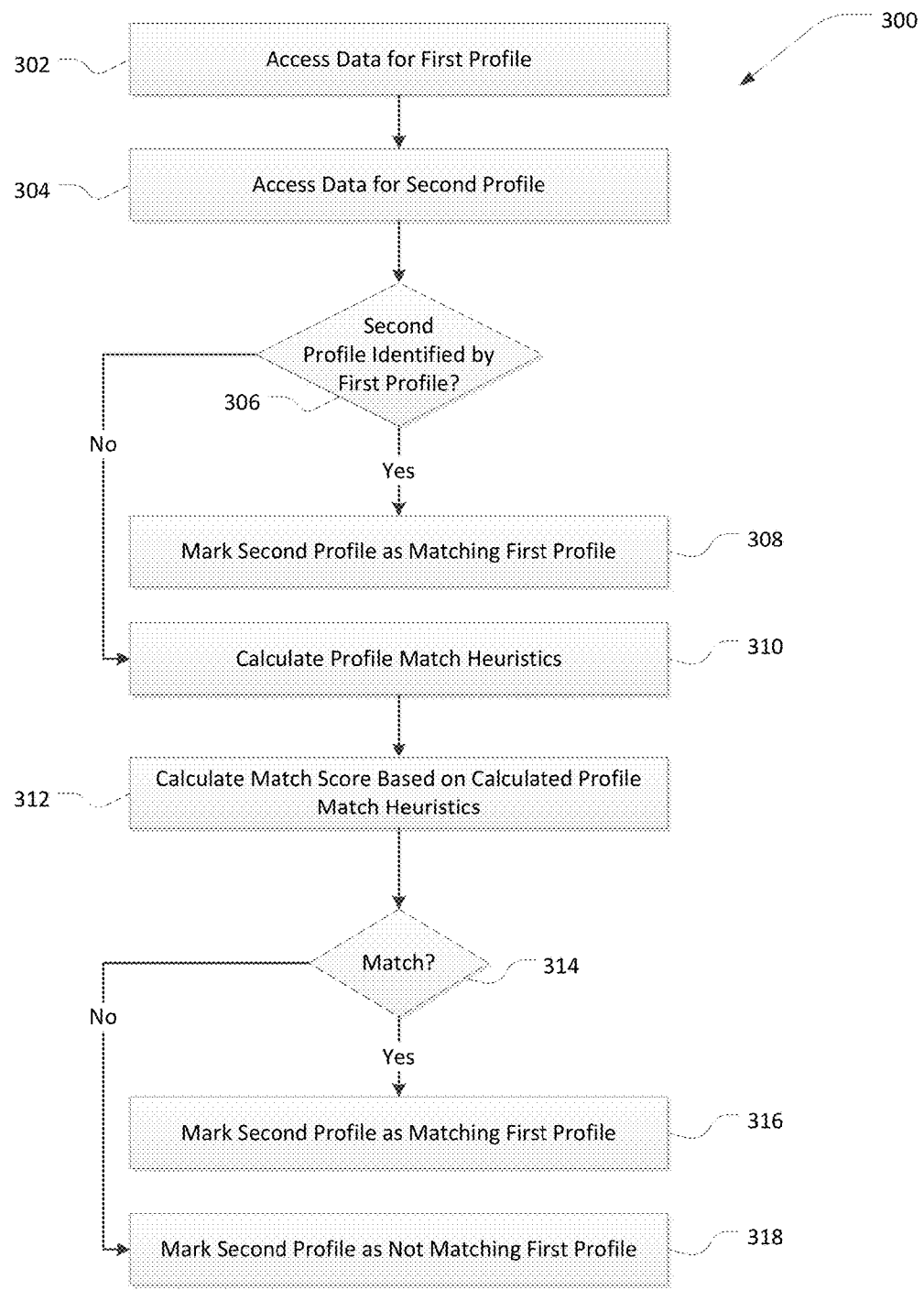
FIG. 3 shows example steps of a process for calculating a match score for two profiles in accordance with at least one embodiment.

FIG. 3 shows an illustrative example of a process 300 for matching profiles in accordance with an embodiment. The process 300 may be performed, for example, by a reputation data processing system such as described above. Some or all of the process 300 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 300, in an embodiment, includes accessing 302 data for a first profile, such as described above in connection with FIGS. 1 and 2. Similarly, process 300 includes accessing 304 data for a second profile such as described above in connection with FIGS. 1 and 2. The first profile may be a profile known to be associated with a particular individual, such as an employee of an organization. The second profile may be a profile that is a candidate for a profile that is associated with the same individual. The first and second profiles may be profiles of different social networks or, generally, of different data sources. The second profile may be identified in numerous ways. For example, a name and/or other information of associated with the individual may be used to construct a search query that is submitted to identify profiles. Using the individual's name as an example, the second profile can be a profile from a set of profiles identified by a search engine as being associated with the same or similar name. Additional data, such as a location (e.g. city, state, or other identifier of a geographic area), may be used to construct more specific search queries. Generally, however, the second profile may be identified in any suitable manner. Further, it should be noted that the data available for the second profile may differ from the data available for the first profile. For example, if the first and second profiles are from different data sources, the data sources may be configured to provide different data sets. Also, different access rights may enable differing sets of information accessible. For example, an employee of the organization may have installed a white label application generated by the organization and, as a result, granted access to a larger set of information for the first profile than would otherwise be accessible to the organization. It should be noted and understood that the second profile (i.e., the candidate profile for a match) can be from the same social network as the first, but not an identical profile as the first.

Returning to the process 300, a determination may be made 306 whether the second profile is identified by the first profile. For example, it may be determined that the first profile belongs to an employee of an organization. The employee may have indicated that he or she owns the first profile. The first profile may include a data field that is populated with a uniform resource locator (URL) and/or other identifier for the second profile. As noted, the first profile may be part of one social network system and the second profile may be from another social networking system and the first social networking system may enable users to identify profiles they own of other social networking systems.

If it is determined 306 that the second profile is identified by the first profile then the second profile is marked 308 as matching the first profile. Marking the second profile as matching the first profile may include storing data in a database or other data storage system that indicates that the second profile and the first profile match. If it is determined 306 that the second profile is not identified by the first profile, then one or more match heuristics are calculated 310 to determine whether the profiles match. A match score is then calculated 312 based at least in part on the calculated profile match heuristics. The match score may be a function of the heuristics that have been calculated. In particular, the match score may be φ discussed above, either in the Boolean domain or the [0,1] range, or may be based at least in part on φ.

The match score may be used to make a determination 314 whether there is a match. In an embodiment, determining whether there is a match includes comparing the match score with a reference value to determine whether the match score exceeds the reference value. For instance, using φ in the [0,1] range, discussed above, if φ is greater than 0.5, it may be determined that there is a match. Other reference values may also be used. For example, values greater than 0.5 may be used if it is more important in a particular context to be sure that there is a match. If it is determined 314 that there is a match, the second profile may be marked 316 as matching the first profile, such as described above. Similarly, if it is determined 314 that there is not a match, the second profile may be marked 318 as not matching the first profile, such as described above.

It should be noted that if it is determined that there is not a match, the second profile may not be marked as not matching the first profile. However, marking the second profile as not matching the first profile may be useful, for example, in instances where the process 300 is performed multiple times. In this manner, performing the process 300 for the same set of profiles repeatedly and unnecessarily may be avoided by marking the second profile as not matching the first profile.

Figure 4:
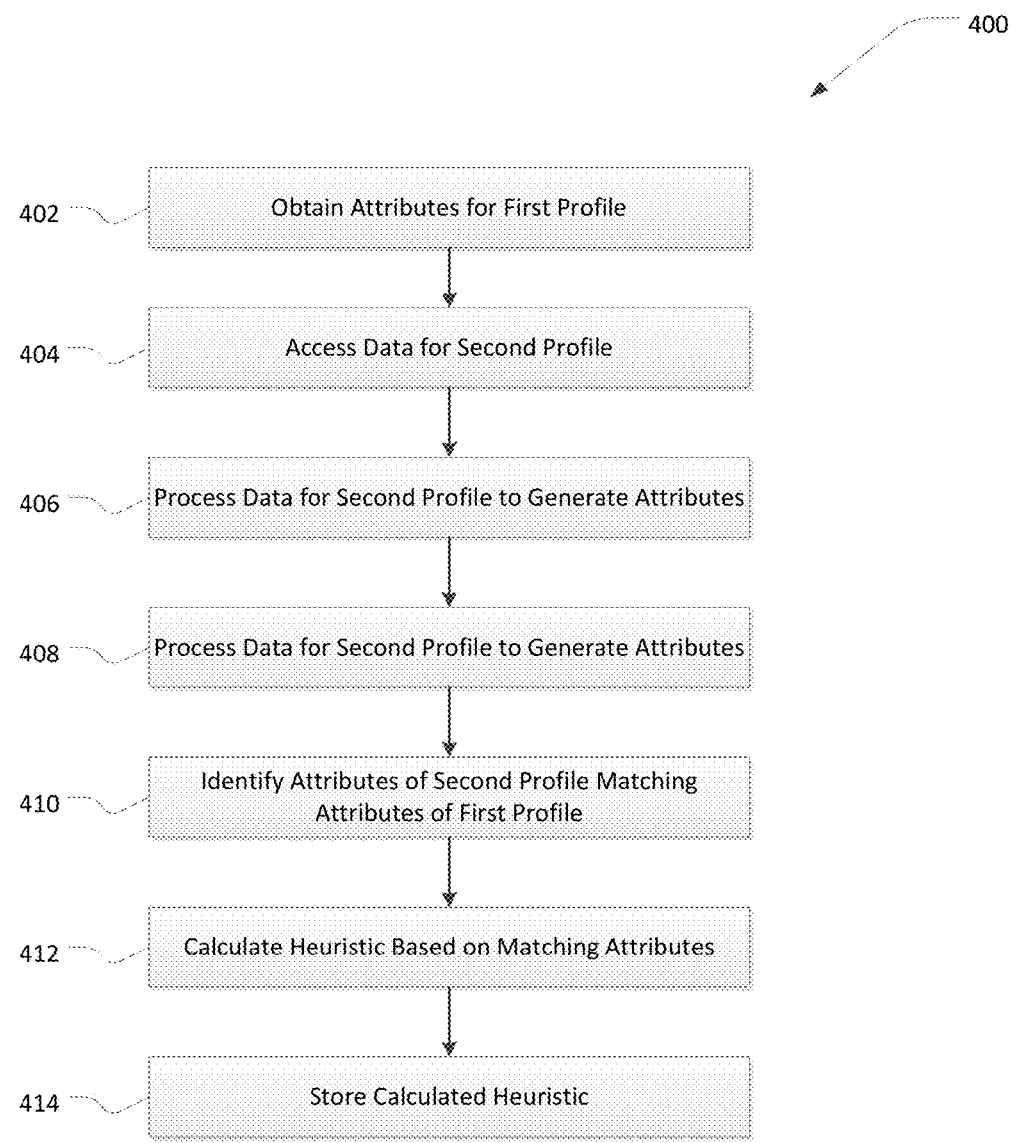
FIG. 4 shows example steps of an attribute-based process for calculating a heuristic relating to whether two profiles match one another in accordance with at least one embodiment.

As noted, numerous heuristics may be calculated to determine whether or not two profiles match. FIG. 4 accordingly shows an illustrative example of a process 400 which may be used to calculate a particular heuristic. In particular, the process 400 includes analyzing attributes of profiles to determine whether the attributes match and, depending on the number of matching attributes, calculating the heuristic. In an embodiment, the process 400 includes obtaining 402 attributes for a first profile. Obtaining attributes for the first profile may be performed in any suitable manner, such as by calculating the attributes and/or accessing the attributes, which have been pre-calculated, from a data store. Example attributes are described below.

The process 400, in an embodiment, also includes accessing 404 data for the second profile. Accessing data for the second profile may be performed in any suitable manner, such as by obtaining data from an external source, such as described above in connection with FIGS. 1 and 2. The data for the second profile may then be processed 406 to generate attributes for the second profile. Processing the data for the second profile may be performed in any suitable manner and the manner may depend on whether or not the data is structured or unstructured. For example, for structured data, data mapping data fields of the second profile to another schema may be used. As an example, analysis may determine whether or not the profile includes an e-mail address for an owner of the second profile. Other attributes may include names of locations, names of institutions, such as organizations in which an owner of the profile alleges to have worked, educational institutions which an owner of the second profile alleges to have attended, and the like. Numerous techniques may be used to process the data for the first and/or second profile. For example, structured and/or unstructured data may be analyzed using entity identification techniques (often referred to as Named-entity recognition (NER) techniques and entity extraction techniques). Example techniques include those utilized in the OpenNLP NameFinder, the Illinois NER system, the Stanford NER system, and the Lingpipe NER system, and/or combinations thereof. For example, such NER techniques may be used to extract information from structured, semi-structured, and/or structured profile data, which may come from the profiles themselves or information available from the profile, such as resumes or separate biographical summaries. The information extracted may be, for instance, school names, job titles, and the like.

In an embodiment, the process 400 includes identifying 410 attributes of the second profile matching attributes of the first profile. A heuristic may then be calculated 412 based at least in part on the matching attributes. Attributes may be weighted depending on their reliability and/or uniqueness. For example, e-mail addresses are generally unique to individuals and therefore e-mail addresses matching may be weighted higher than other data, which may not be as reliable or as unique. For example, user names are often not unique to individuals. One individual may use a particular user name in one social network and another may use the same user name in a second social network. In this manner, a matching user name may be weighted less. Similarly, names of locations that do not match may be weighted less because individuals often move from place to place and neglect to update social network profiles. In addition, many people may live in the same location. Therefore, the existence or lack of a match in location attributes may not be weighted as heavily as other data. Phone numbers matching also may generally be reliable although not certainly so, as people may stop using a particular phone number and a phone company may provide that phone number for use by another person. Generally the heuristic may be calculated in any suitable manner and the calculated heuristic may then be stored 414.

Figure 5:
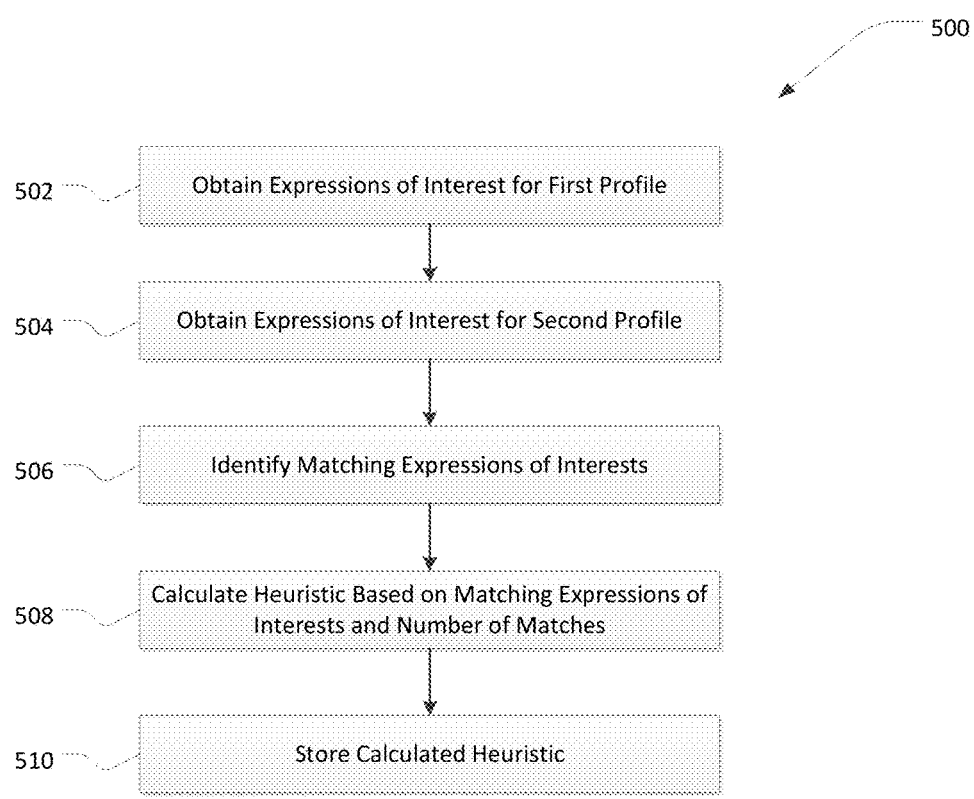
FIG. 5 shows example steps of a process for calculating another heuristic based at least in part on common expressions of interest in accordance with at least one embodiment.

Many social network systems allow users to express interest in various things. For example, companies often maintain their own social networking profiles. Users may express interest in that company through a user interface of a social networking system. For example, the company Facebook allows users to "like" various things, where a "like" is an electronic expression of interest in something. Other items in which users may express interest may include photographs, quotations, sports teams, institutions, organizations, individuals and/or generally anything that may be represented by data. Accordingly, FIG. 5 shows an illustrative example of a process 500 for calculating a heuristic based on whether two profiles indicate expressions of interest for common things. The process 500 in an embodiment includes obtaining 502 expressions of interest for a first profile. For example, using the social network Facebook as an example, the likes stored with the first profile may be obtained. Similarly, process 500 includes obtaining 504 expressions of interest for the second profile.

The process 500 may then include identifying 506 matching expressions of interest. For example, if the first profile and second profile both indicate an expression of interest in a particular sports team, there may be a match. Similarly, if the first profile indicates an expression of interest in a profile of an individual and the second profile indicates an expression of interest in a profile that is determined to be for the same individual, there may be a match.

The process 500 may then include calculating 508 a heuristic based on the matching expressions of interest and the number of matches. Some matching expressions of interest may be weighted higher than others. For example, some items obtain relatively a lot of expressions of interest. Millions of users, for example, may have expressed interest in a particular product or sports team. Thus it is not uncommon for two profiles to have expressions of interest in the same profile. On the other hand, it is less likely that two profiles that are unrelated will express interest in the same relatively unknown individual. In this manner, the actual total expressions of interest in an overall community may also be used in calculating the heuristic. Calculation of a heuristic may be, for instance, score determined based on the number of expressions of interest for both profiles and the number of total expressions of interest (e.g. among the general public). The heuristic may be calculated, for example, such that higher numbers of total expressions of interest affect the heuristic less than lower numbers (because higher numbers of total expressions of interest make coincidental common expressions of interest in both profiles more likely). Similarly, the heuristic may also be calculated such that greater numbers of expressions of interest in both profiles cause the heuristic to be higher. As above, the calculated heuristic may then be stored 510 in a data store and used for various purposes, such as for calculating a match score for the two profiles.

Figure 6:
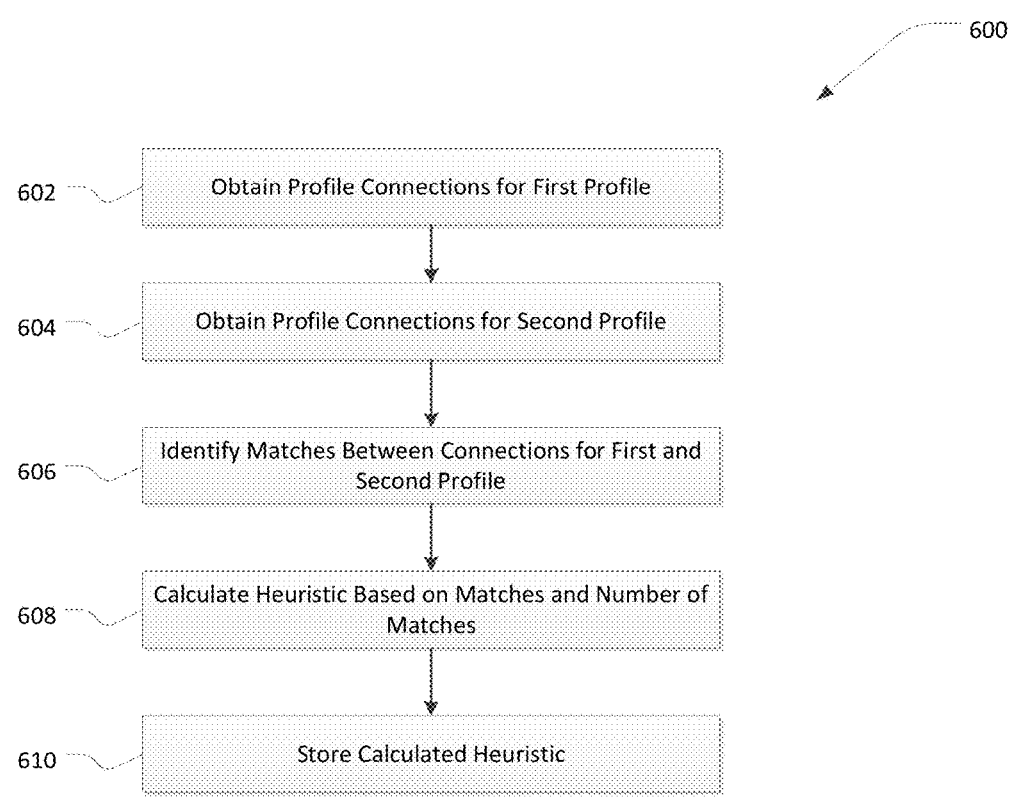
FIG. 6 shows example steps of a process for calculating another heuristic based at least in part on common connections in social networks in accordance with at least one embodiment.

As noted, one heuristic that may be used is based at least in part on the number of connections in common among two profiles. FIG. 6 shows an illustrative example of a process 600 for calculating a heuristic based on social network connections. This process 600, in an embodiment, includes obtaining 602 profile connections for a first profile. Similarly, process 600 includes obtaining 604 profile connections for a second profile. Matches between connections for the first profile and the second profile may then be identified 606. Identifying matching connections may be performed in various ways. For example, when the first and second profiles are from different social networks, various analysis, including profile matching techniques may be performed to make determinations regarding connections in common. For example, if the first profile is connected to a profile for someone claiming to be John Smith in a first social network and the second profiles is connected to a profile for someone claiming to be John Smith in a second social network, various analysis techniques, including those described herein, may be used to determine whether the two profiles for John Smith are the same profile.

In an embodiment, once the matching connections between the two profiles are identified, a heuristic is calculated 608 based at least in part on the number of connections identified in common. As illustrated, the heuristic is also calculated based at least in part on the connections themselves. For example, some connections in common are more likely to indicate a matching profile than others. For instance, many companies maintain social network profiles in multiple social networks. Such profiles often have thousands or even millions of connections. Accordingly, such connections in common are less likely to indicate matching profiles than connections to profiles that have relatively fewer total connections. Accordingly, connections in common may be weighted based at least in part on those connections' total number of connections. Thus, if a connection in common itself has many connections, such a connection would affect the heuristic less than a connection in common that itself has fewer connections. As with other heuristics, once calculated, the calculated heuristic may be stored 610 in a data store.

Figure 7:
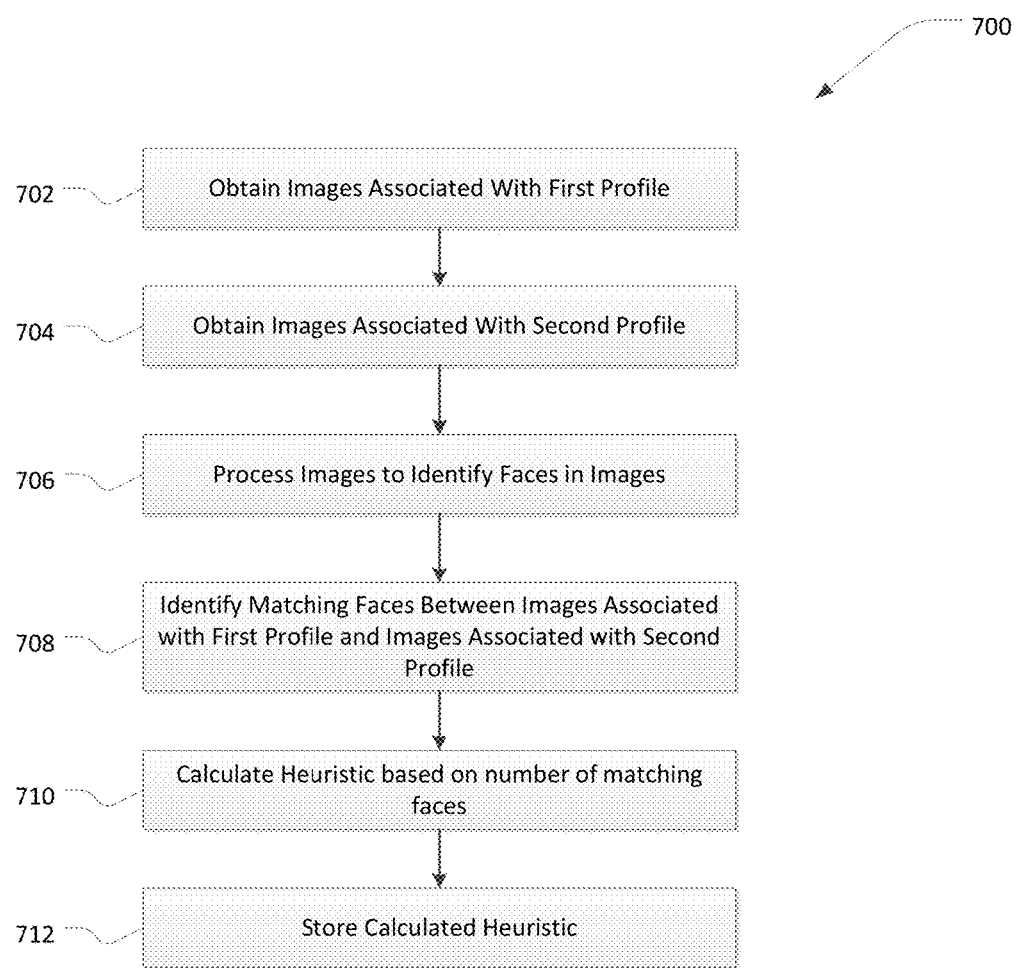
FIG. 7 shows example steps of a process for calculating another heuristic using at least one facial recognition algorithm in accordance with at least one embodiment.

As noted, techniques of the present disclosure include determining whether profiles match using various image processing techniques. Many social networks and other information sources allow users to post and perform other activities with electronic images. Users of Facebook, for example, are able to post pictures for others to see. FIG. 7 shows an illustrative example of a process 700 for calculating a heuristic based at least in part on such images. In an embodiment, the process 700 includes obtaining 702 images associated with a first profile and obtaining 704 images associated with a second profile, such as by using techniques described above involving obtaining data for profiles.

In an embodiment, the obtained images are processed 706 to identify faces in the images. Any suitable image processing technique or combination of techniques may be used. Example techniques include Principal Component Analysis using eigenfaces, neuronal motivated dynamic link matching, Linear Discriminate Analysis, the Hidden Markov model, and Elastic Bunch Graph Matching using the Fisherface algorithm, and/or others.

Once processed, matching faces between images associated with the first profile and images associated with the second profiles are identified 708. Identifying the matching faces may be performed in any suitable manner, which may depend on the technique or techniques used to identify the faces. Generally, however, matching faces may be performed by checking the faces of the images of the first profile against the faces of the images of the second profile to determine which faces are calculated to belong to the same person.

Once matches have been identified, a heuristic may be calculated 710 based at least in part on the number of matches. Calculation of the heuristic may be performed such that more matches correspond to a higher heuristic value. Once calculated, the calculated heuristic may be stored 712 in a data store for uses, such as described above.

Some tools may allow for users of social network and other electronic environments to concurrently post content to two social networks. A tweet by a user, for example, may be posted to a Facebook page of the user. Such tools may, for example, be third party applications that detect content postings for one electronic environment and utilize an API of the other electronic environment to post the content (or content based at least in part on the posted content) to the second electronic environment. In addition, in some instances, users may manually post the same content in two electronic environments. A user may, for instance, consider a news article to be particularly interesting and may separately use two different interfaces (e.g. smartphone application interface and/or web interface through a web browser) to share the article in two separate social networks, such as Facebook and LinkedIn.

Figure 8:
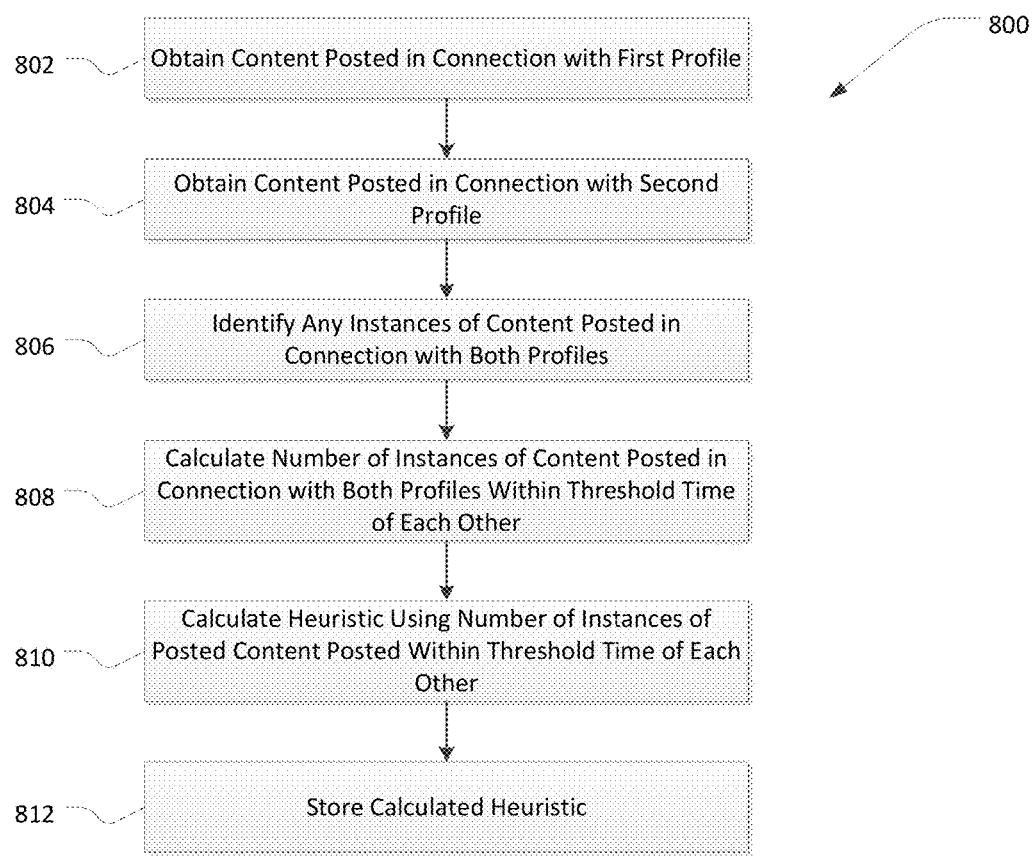
FIG. 8 shows example steps of a process for calculating another heuristic based at least in part on concurrent postings in accordance with at least one embodiment.

FIG. 8, accordingly, shows an illustrated example of a process 800 for calculating a heuristic based at least in part on concurrent postings. In this example, the process 800 includes obtaining 802 content posted in connection with a first profile. The first profile may be, for instance, a profile of a social network. The content may be any content postable in an electronic environment hosting the first profile. Examples of profiles, electronic environments, and types of content are discussed above. In addition, the content may include multiple instances of content, perhaps of different types. For example, the obtained content may include multiple tweets or other posts.

As illustrated, the process 800 also includes obtaining 804 content posted in connection with a second profile, such as discussed above in connection with obtaining content posted in connected with the first profile. The second profile may be from an electronic environment that is different from an electronic environment hosting the first profile. However, in performance of the process 800, other processes described herein, and variations thereof, the first profile and second profile may be from the same electronic environment. As just one example, the first profile and second profile may both be from the same social network. If the profiles match the same individual, it may be due to the individual having created two separate profiles in the same social network, perhaps to separate a profile disclosed to an employer from a profile undisclosed to the employer to be used for more social activity. Further, while FIG. 8 shows obtaining content in connection with the first profile being performed before obtaining content in connection with the second profile, the order may be different and obtaining content may be performed in parallel, e.g. through two concurrent server connections.

Once the content posted in connection with the first and second profiles have been obtained, in an embodiment, instances of content posted in connection with both profiles may be identified 806. Identifying content posted in connection with both profiles may be performed in any suitable manner. For example, for textual content, a text search for some or all text in an instance of content posted in connection with one profile may be performed against instances of content posted in connection with the second profile. With non-textual content, appropriate techniques may be employed. For example, if an instance of content for one profile includes a file name or other identifier (URL, e.g.), the file name or other identifier can be searched against instances of content of the other profile. As another example, hash values or other signatures may be calculated for instances of content of both profiles and checks for matching hash values may be performed. Generally, any method for checking whether content from one profile matches content from the other may be used.

In an embodiment, the process 800 includes calculating 808 the number of instances of content posted in connection with both profiles within a threshold time of each other. The threshold may be some value selected to indicate concurrency, such as one minute, five minutes, or some other time duration. The duration may also be a configurable parameter, for example, configurable by a user of a user interface used in connection with a reputation data processing system, such as described above. A user may, for instance, increase the value to identify more matches and decrease the value to locate less matches, but ones that are posted closer to one another and, therefore, more indicative of matching profiles. Accordingly, in an embodiment, a heuristic is calculated 810 based at least in part on the calculated number of instances of content posted in connection with both profiles within the threshold time of each other. The heuristic may be a score configured to increase with increased numbers of matches. The score may be bounded in some embodiments (e.g. confined to the range [0,1]) or, in other embodiments, may be unbounded. Other factors, such as the total number of posts, may also be used in calculating the heuristic. For example, the heuristic may be or be based at least in part on a ratio of matches to total posts, thereby causing the heuristic to increase when a greater percentage of posts match both profiles.

As with other processes described herein, additional variations are considered as being within the scope of the present disclosure and not all variations are explicitly described. For example, another mechanism for matching can be based on links found in the profiles as correlating attributes. For example, a Facebook profile and a LinkedIn profile that contain a large intersection of sets of hyperlinks are likely to be related. Many social networks allow users to specify a personal website. Therefore, if two or more profiles specify the same personal site they are likely strongly correlated. So, like using images or other content as described above, hyperlinks within the profiles can also be the basis of identifying matches and calculating heuristics. Stated another way, calculating one or more heuristics can comprise obtaining a set of hyperlinks posted in connection with the first profile, obtaining a set of hyperlinks posted in connection with the second profile, identifying hyperlinks posted in connection with the first profile that at least partially matches hyperlinks posted in connection with the second profile, calculating a number of matching hyperlinks that are posted to both the first profile and the second profile, and calculating a heuristic based at least in part on the calculated number of matching hyperlinks. Once again, additional variations are considered as being within the scope of the present disclosure and not all variations are explicitly described.

Figure 9:
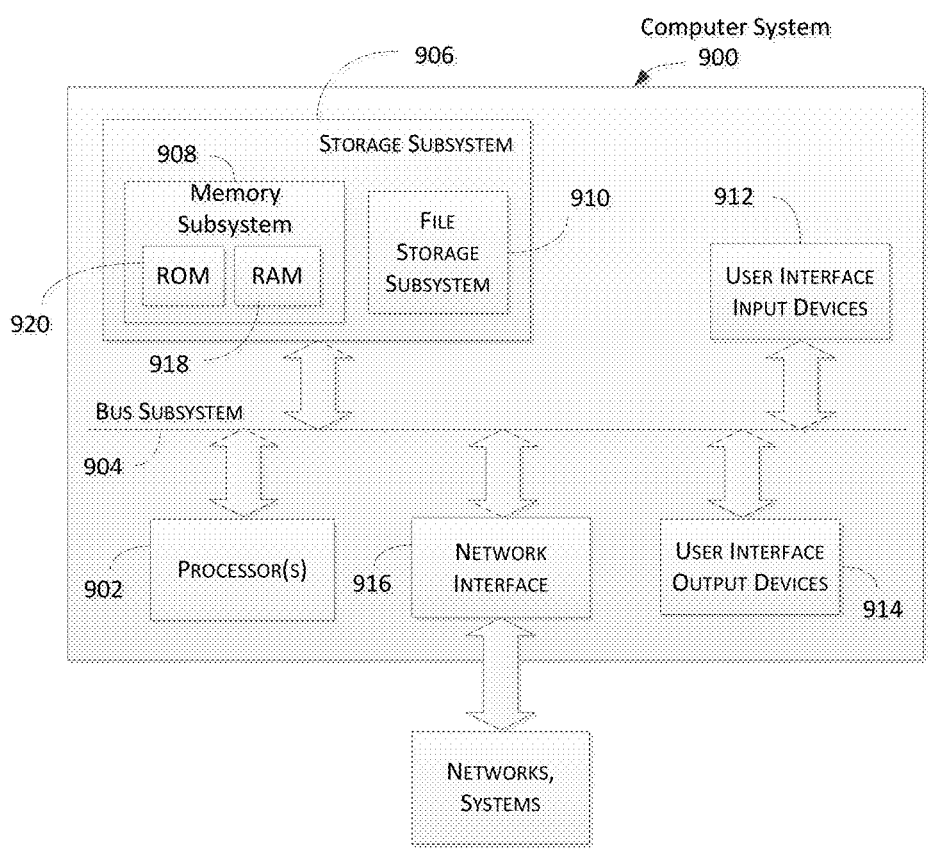
FIG. 9 shows an example computer system that may be used to implement various aspects of the present disclosure.

FIG. 9 is a simplified block diagram of a computer system 900 that may be used to practice an embodiment of the present invention. Computer system 900 may serve as a reputation data processing system, or component computer system instance thereof, such as described above and/or a computer system that presents a user interface in accordance with the various embodiments described herein. In addition, computer system 900 may perform calculations to determine whether profiles match utilizing various techniques described above. As shown in FIG. 9, computer system 900 includes a processor 902 that communicates with a number of peripheral subsystems via a bus subsystem 904. These peripheral subsystems may include a storage subsystem 906, comprising a memory subsystem 908 and a file storage subsystem 910, user interface input devices 912, user interface output devices 914, and a network interface subsystem 916.

Bus subsystem 904 provides a mechanism for letting the various components and subsystems of computer system 900 communicate with each other as intended. Although bus subsystem 904 is shown schematically as a single bus, alternative embodiments of the bus subsystem may utilize multiple busses.

Network interface subsystem 916 provides an interface to other computer systems, networks, and portals. Network interface subsystem 916 serves as an interface for receiving data from and transmitting data to other systems from computer system 900. The network interface subsystem 916, for example, may enable the computer system 900 to communicate with other computer systems over a network, such as to obtain data from various data sources and/or to communicate with other components of a reputation data processing system.

User interface input devices 912 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 900. A user may use an input device to provide user input to interact with a user interface to perform various activities described above. For example, a user may use an input device to view profiles determined to match or potentially match other profiles. In addition, the user may use an input device to input determinations whether calculations of whether profiles match are correct, thereby causing a reputation data processing system or other system to operate accordingly, such as by using data from a profile determined to match a known profile or by not using data from a profile determined to be a mismatch.

User interface output devices 914 may include a display subsystem, a printer, a fax machine, or non-visual displays such as audio output devices, etc. The display subsystem may be a cathode ray tube (CRT), a flat-panel device such as a liquid crystal display (LCD), a light emitting diode (LED) display, a projection device, and/or another device capable of presenting information. In general, use of the term "output device" is intended to include all possible types of devices and mechanisms for outputting information from computer system 900. Presentations generated in accordance with the various embodiments described herein, for example, may be presented using output devices 914. Various presentations may, for instance, present profiles of social network users and/or information associated therewith to users of the computer system 900.

Storage subsystem 906 provides a computer-readable medium for storing the basic programming and data constructs that provide the functionality of the present invention. Software (programs, code modules, instructions) that when executed by a processor provide the functionality of the present invention may be stored in storage subsystem 906. These software modules or instructions may be executed by processor(s) 902. Storage subsystem 906 may also provide a repository for storing data used in accordance with the present invention, for example, the data stored in the diagnostic data repository. For example, storage subsystem 906 provides a storage medium for persisting data that is analyzed to calculate various reputation metrics and/or reputation values. Storage subsystem 906 may comprise memory subsystem 908 and file/disk storage subsystem 910.

Memory subsystem 908 may include a number of memory components including a main random access memory (RAM) 918 for storage of instructions and data during program execution and a read only memory (ROM) 920 in which fixed instructions are stored. File storage subsystem 910 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 900 can be of various types including a personal computer, a portable computer, a smartphone, a table computing device, a workstation, a network computer, a mainframe, a kiosk, a server or any other data processing system. Due to the ever-changing nature of computers and networks, the description of computer system 900 depicted in FIG. 9 is intended only as a specific example for purposes of illustrating the preferred embodiment of the computer system. Many other configurations having more or fewer components than the system depicted in FIG. 9 are possible.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method for aggregating social network profiles, the method comprising:
    accessing, by a talent management system of an enterprise, data of a first profile from a first data source, wherein the first data source comprises at least one internal data source operated by the enterprise and wherein the first profile comprises a profile of an employee of the enterprise or candidate for employment by the enterprise and includes human resource information of the enterprise related to the employee of the enterprise or candidate for employment by the enterprise;
    accessing, by the talent management system, data of a second profile from a second data source, wherein the second data source comprises at least one external data source operated by or on behalf of an entity different from the enterprise, the at least one external data source comprising at least one social network system;
    determining, by the talent management system, whether the first profile contains a uniform resource locator (URL) that identifies the second profile;
    in response to determining that the first profile contains the URL that identifies the second profile, identifying, by the talent management system, the second profile as matching the first profile;
    in response to determining that the first profile does not contain the URL that identifies the second profile:
        calculating, by the talent management system, one or more heuristics, each of the one or more heuristics being based on one or more attributes of the first profile having a matching one or more attributes in the second profile,
        weighting, by the talent management system, the one or more heuristics based on, for each of the one or more heuristics, a reliability of the one or more attributes on which the heuristic is based,
        calculating, by the talent management system, a match score from the one or more weighted heuristics; and
        determining, by the talent management system, whether the first profile and the second profile match based on the calculated match score; and
    in response to determining that the first profile and the second profile match, storing an indication that the first profile and the second profile match and the second profile belongs to the employee of the enterprise or candidate for employment by the enterprise.

2. The method of claim 1, wherein calculating one of the one or more heuristics comprises:
    obtaining attributes of the first profile;
    generating attributes of the second profile;
    identifying attributes of the second profile matching attributes of the first profile; and
    calculating the one of the one or more heuristics based at least in part on the identified matching attributes, and wherein weighting the one of the one or more heuristics is further based a weight that indicates a significance of the one of the one or more heuristics and is calculated based on an accuracy of matches made in examined social profiles.

3. The method of claim 1, wherein calculating one of the one or more heuristics comprises:
   obtaining one or more expressions of interest from the first profile;
   obtaining one or more expressions of interest from the second profile;
   identifying expressions of interest from the second profile matching expressions of interest from the first profile; and
   calculating the one or more heuristics based at least in part on the identified matching expressions of interest, and wherein weighting the one of the one or more heuristics is further based on a weight that indicates a significance of the one of the one or more heuristics and is calculated based on an accuracy of matches made in examined social profiles.

4. The method of claim 1, wherein calculating one of the one or more heuristics comprises:
   obtaining one or more profile connections from the first profile;
   obtaining one or more profile connections from the second profile;
   identifying profile connections from the second profile matching profile connections from the first profile; and
   calculating the one or more heuristics based at least in part on the identified matching profile connections, and wherein weighting the one of the one or more heuristics is further based on a weight that indicates a significance of the one of the one or more heuristics and is calculated based on an accuracy of matches made in examined social profiles.

5. The method of claim 1, wherein calculating one of the one or more heuristics comprises:
   obtaining one or more images associated with the first profile;
   obtaining one or more images associated with the second profile;
   identifying faces within the obtained images associated with the first profile and the images associated with the second profile;
   identifying images associated with the second profile matching images associated with the first profile based on the identified faces; and
   calculating the one or more heuristics based at least in part on the identified matching images, and wherein weighting the one of the one or more heuristics is further based on a weight that indicates a significance of the one of the one or more heuristics and is calculated based on an accuracy of matches made in examined social profiles.

6. The method of claim 1, wherein calculating one of the one or more heuristics comprises:
   obtaining content posted in connection with the first profile;
   obtaining content posted in connection with the second profile;
   identifying content posted in connection with the first profile that at least partially matches content posted in connection with the second profile;
   calculating a number of instances of at least partially matching content that is posted to both the first profile and the second profile within a time threshold; and
   calculating the one or more heuristics based at least in part on the calculated number of instances, and wherein weighting the one of the one or more heuristics is further based on a weight that indicates a significance of the one of the one or more heuristics and is calculated based on an accuracy of matches made in examined social profiles.

7. The method of claim 1, wherein calculating one of the one or more heuristics comprises:
   obtaining a set of hyperlinks posted in connection with the first profile;
   obtaining a set of hyperlinks posted in connection with the second profile;
   identifying hyperlinks posted in connection with the first profile that at least partially matches hyperlinks posted in connection with the second profile;
   calculating a number of matching hyperlinks that are posted to both the first profile and the second profile; and
   calculating the one or more heuristics based at least in part on the calculated number of matching hyperlinks, and wherein weighting the one of the one or more heuristics is further based on a weight that indicates a significance of the one of the one or more heuristics and is calculated based on an accuracy of matches made in examined social profiles.

8. A system comprising:
   a processor; and
   a memory coupled with and readable by the processor and storing therein a set of instructions which, when executed by the processor, causes the processor to aggregate social network profiles by:
      accessing data of a first profile from a first data source, wherein the first data source comprises at least one internal data source operated by an enterprise and wherein the first profile comprises a profile of an employee of the enterprise or candidate for employment by the enterprise and includes human resource information of the enterprise related to the employee of the enterprise or candidate for employment by the enterprise;
      accessing data of a second profile from a second data source, wherein the second data source comprises at least one external data source operated by or on behalf of an entity different from the enterprise, the at least one external data source comprising at least one social network system;
      determining whether the first profile contains a uniform resource locator (URL) that identifies the second profile;
      in response to determining that the first profile contains the URL that identifies the second profile, identifying the second profile as matching the first profile;
      in response to determining that the first profile does not contain the URL that identifies the second profile:
         calculating one or more heuristics, each of the one or more heuristics being based on one or more attributes of the first profile having a matching one or more attributes in the second profile,
         weighting the one or more heuristics based on, for each of the one or more heuristics, a reliability of the one or more attributes on which the heuristic is based,
         calculating a match score from the one or more weighted heuristics, and
         determining whether the first profile and the second profile match based on the calculated match score; and
      in response to determining that the first profile and the second profile match, storing an indication that the first profile and the second profile match and the second profile belongs to the employee of the enterprise or candidate for employment by the enterprise.

9. The system of claim 8, wherein calculating one of the one or more heuristics comprises:
   obtaining attributes of the first profile;
   generating attributes of the second profile;
   identifying attributes of the second profile matching attributes of the first profile; and
   calculating the one of the one or more heuristics based at least in part on the identified matching attributes, and wherein weighting the one of the one or more heuristics is further based on a weight that indicates a significance of the one of the one or more heuristics and is calculated based on an accuracy of matches made in examined social profiles.

10. The system of claim 8, wherein calculating one of the one or more heuristics comprises:
    obtaining one or more expressions of interest from the first profile;
    obtaining one or more expressions of interest from the second profile;
    identifying expressions of interest from the second profile matching expressions of interest from the first profile; and
    calculating the one or more heuristics based at least in part on the identified matching expressions of interest, and wherein weighting the one of the one or more heuristics is further based on a weight that indicates a significance of the one of the one or more heuristics and is calculated based on an accuracy of matches made in examined social profiles.

11. The system of claim 8, wherein calculating one of the one or more heuristics comprises:
    obtaining one or more profile connections from the first profile;
    obtaining one or more profile connections from the second profile;
    identifying profile connections from the second profile matching profile connections from the first profile; and
    calculating the one or more heuristics based at least in part on the identified matching profile connections, and wherein weighting the one of the one or more heuristics is further based on a weight that indicates a significance of the one of the one or more heuristics and is calculated based on an accuracy of matches made in examined social profiles.

12. The system of claim 8, wherein calculating one of the one or more heuristics comprises:
    obtaining one or more images associated with the first profile;
    obtaining one or more images associated with the second profile;
    identifying faces within the obtained images associated with the first profile and the images associated with the second profile;
    identifying images associated with the second profile matching images associated with the first profile based on the identified faces; and
    calculating the one or more heuristics based at least in part on the identified matching images, and wherein weighting the one of the one or more heuristics is further based on a weight that indicates a significance of the one of the one or more heuristics and is calculated based on an accuracy of matches made in examined social profiles.

13. The system of claim 8, wherein calculating one of the one or more heuristics comprises:
    obtaining content posted in connection with the first profile;
    obtaining content posted in connection with the second profile;
    identifying content posted in connection with the first profile that at least partially matches content posted in connection with the second profile;
    calculating a number of instances of at least partially matching content that is posted to both the first profile and the second profile within a time threshold; and
    calculating the one or more heuristics based at least in part on the calculated number of instances, and wherein weighting the one of the one or more heuristics is further based on a weight that indicates a significance of the one of the one or more heuristics and is calculated based on an accuracy of matches made in examined social profiles.

14. The system of claim 8, wherein calculating one of the one or more heuristics comprises:
    obtaining a set of hyperlinks posted in connection with the first profile;
    obtaining a set of hyperlinks posted in connection with the second profile;
    identifying hyperlinks posted in connection with the first profile that at least partially matches hyperlinks posted in connection with the second profile;
    calculating a number of matching hyperlinks that are posted to both the first profile and the second profile; and
    calculating the one or more heuristics based at least in part on the calculated number of matching hyperlinks, and wherein weighting the one of the one or more heuristics is further based on a weight that indicates a significance of the one of the one or more heuristics and is calculated based on an accuracy of matches made in examined social profiles.

15. A computer-readable memory comprising a set of instructions stored therein which, when executed by a processor, causes the processor to aggregate social network profiles by:
    accessing data of a first profile from a first data source, wherein the first data source comprises at least one internal data source operated by an enterprise and wherein the first profile comprises a profile of an employee of the enterprise or candidate for employment by the enterprise and includes human resource information of the enterprise related to the employee of the enterprise or candidate for employment by the enterprise;
    accessing data of a second profile from a second data source, wherein the second data source comprises at least one external data source operated by or on behalf of an entity different from the enterprise, the at least one external data source comprising at least one social network system;
    determining whether the first profile contains a uniform resource locator (URL) that identifies the second profile;
    in response to determining that the first profile contains the URL that identifies the second profile, identifying the second profile as matching the first profile;
    in response to determining that the first profile does not contain the URL that identifies the second profile:
      calculating one or more heuristics, each of the one or more heuristics being based on one or more attributes of the first profile having a matching one or more attributes in the second profile, weighting the one or more heuristics based on, for each of the one or more heuristics, a reliability of the one or more attributes on which the heuristic is based, calculating a match score from the one or more weighted heuristics, and determining whether the first profile and the second profile match based on the calculated match score; and in response to determining that the first profile and the second profile match, storing an indication that the first profile and the second profile match and the second profile belongs to the employee of the enterprise or candidate for employment by the enterprise.

16. The computer-readable memory of claim 15, wherein calculating one of the one or more heuristics comprises:

obtaining attributes of the first profile;

generating attributes of the second profile;

identifying attributes of the second profile matching attributes of the first profile; and calculating the one of the one or more heuristics based at least in part on the identified matching attributes, and wherein weighting the one of the one or more heuristics is further based on a weight that indicates a significance of the one of the one or more heuristics and is calculated based on an accuracy of matches made in examined social profiles.

17. The computer-readable memory of claim 15, wherein calculating one of the one or more heuristics comprises:

obtaining one or more expressions of interest from the first profile;

obtaining one or more expressions of interest from the second profile;

identifying expressions of interest from the second profile matching expressions of interest from the first profile; and calculating the one or more heuristics based at least in part on the identified matching expressions of interest, and wherein weighting the one of the one or more heuristics is further based on a weight that indicates a significance of the one or more heuristics and is calculated based on an accuracy of matches made in examined social profiles.

18. The computer-readable memory of claim 15, wherein calculating one of the one or more heuristics comprises:

obtaining one or more profile connections from the first profile;

obtaining one or more profile connections from the second profile;

identifying profile connections from the second profile matching profile connections from the first profile; and calculating the one or more heuristics based at least in part on the identified matching profile connections, and wherein weighting the one of the one or more heuristics is further based on a weight that indicates a significance of the one of the one or more heuristics and is calculated based on an accuracy of matches made in examined social profiles.

19. The computer-readable memory of claim 15, wherein calculating one of the one or more heuristics comprises:

obtaining one or more images associated with the first profile;

obtaining one or more images associated with the second profile;

identifying faces within the obtained images associated with the first profile and the images associated with the second profile;

identifying images associated with the second profile matching images associated with the first profile based on the identified faces; and calculating the one or more heuristics based at least in part on the identified matching images, and wherein weighting the one of the one or more heuristics is further based on a weight that indicates a significance of the one of the one or more heuristics and is calculated based on an accuracy of matches made in examined social profiles.

20. The computer-readable memory of claim 15, wherein calculating one of the one or more heuristics comprises:

obtaining content posted in connection with the first profile;

obtaining content posted in connection with the second profile;

identifying content posted in connection with the first profile that at least partially matches content posted in connection with the second profile;

calculating a number of instances of at least partially matching content that is posted to both the first profile and the second profile within a time threshold; and calculating the one or more heuristics based at least in part on the calculated number of instances, and wherein weighting the one of the one or more heuristics is further based on a weight that indicates a significance of the one of the one or more heuristics and is calculated based on an accuracy of matches made in examined social profiles.

* * * * *

UNITED STATES PATENT AND TRADEMARK OFFICE
CERTIFICATE OF CORRECTION

PATENT NO. : 9,654,594 B2
APPLICATION NO. : 13/932269
DATED : May 16, 2017
INVENTOR(S) : B'Far et al.

Page 1 of 1

It is certified that error appears in the above-identified patent and that said Letters Patent is hereby corrected as shown below:

In the Specification

In Column 4, Line 33, after "embodiment;" delete "and".

In Column 4, Line 36, delete "embodiment." and insert -- embodiment; and --, therefor.

In Column 5, Line 21, delete "the a" and insert -- the --, therefor.

In Column 5, Line 42, delete "evaluate (I)." and insert -- evaluate $\Phi$. --, therefor.

In Column 5, Line 57, delete "$\rho(\phi_i(p_a,p_b)) \leq \rho(\phi_k(p_a,p_b))$" and insert -- $\rho(\phi_j(p_a, p_b)) \leq \rho(\phi_k(p_a, p_b))$. --, therefor.

In the Claims

In Column 22, Line 46, in Claim 1, delete "heuristics;" and insert -- heuristics, --, therefor.

In Column 22, Line 64, in Claim 2, after "based" insert -- on --.

Signed and Sealed this
Thirty-first Day of October, 2017

Joseph Matal
*Performing the Functions and Duties of the
Under Secretary of Commerce for Intellectual Property and
Director of the United States Patent and Trademark Office*